United States Patent Office 3,634,413
Patented Jan. 11, 1972

3,634,413
2-ALKENYL-THIAZOLES
Melvin Harris Rosen, Madison, George de Stevens, Summit, and Herbert Morton Blatter, Springfield, N.J., assignors to Ciba Corporation, Ardsley, N.Y.
No Drawing. Filed May 20, 1968, Ser. No. 730,641
Int. Cl. C09b 23/00
U.S. Cl. 260—240 E                    5 Claims

ABSTRACT OF THE DISCLOSURE 2-(2-pyridyl-lower alkenyl)-thiazoles of the formula

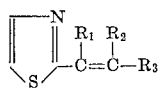

$R_{1,2}$=H or alkyl
$R_3$=a pyridyl radical hydrozenated derivatives and salts thereof are tranquilizers.

BACKGROUND OF THE INVENTION

According to G. Pappalardo et al., Il Farmaco, Ed. Sci. 21, 740 (1966) it is known that thioamides of the forrmula $$H_2NSC—CH=CH—Ar$$

in which Ar is a phenyl, naphthyl, pyridyl, furyl or thienyl radical, exhibit antibacterial activity. In these compounds the thioamide moiety has been modified, to include compounds of the formulae

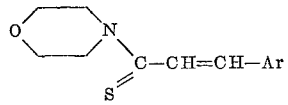

and

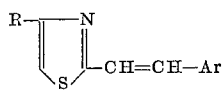

in which latter R is methyl or phenyl. Due to the specific synthesis disclosed, the thiazole moiety in said compounds is substituted in 4-position.

Surprisingly it was found that the 2-(2-pyridyl-vinyl)-thiazoles unsubstituted in the 4-position of the thiazole moiety, and wherein the pyridyl radical is preferably a 3-, especially a 4-pyridyl radical, exhibit valuable transquilizing and antianxiety effects in mammals.

SUMMARY OF THE INVENTION

The present invention concerns and has for its object the provision of new 2-(2-pyridyl-lower alkenyl)-thiazoles of the Formula I

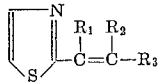

in which each of $R_1$ and $R_2$ is hydrogen or lower alkyl and $R_3$ is a pyridyl radical, of hydrogenated derivatives and of salts thereof, as well as of corresponding pharma-especially a 4-pyridyl radical, exhibit valuable tranquilizceutical compositions and of methods for the preparation and application of these products. Said compositions are useful tranquilizers.

DESCRIPTION OF THE PREFERRED EMBODIMENTS

The radicals $R_1$ and $R_2$ preferably represent hydrogen, but also lower alkyl, such as methyl, ethyl, n- or i-propyl or -butyl. The term "lower," referred to above and hereinafter in connection with organic radicals or compounds respectively, defines such with up to 7, preferably up to 4, carbon atoms.

The pyridyl radical $R_3$ is preferably a 3- or especially a 4-pyridyl radical, which is unsubstituted or substituted by one or more than one of the same or of different radicals, such as lower alkyl, e.g. that mentioned above, lower alkoxy e.g. methoxy, ethoxy, n- or i-propoxy or -butoxy and/or halogen, e.g. fluoro, chloro or bromo.

Hydrogenated derivatives of the compounds of Formula I are preferably those containing an ethylene moiety instead of the ethenylene moiety and/or a 4,5-dihydrothiazolyl radical instead of the thiazolyl radical.

The compounds of the invention exhibit valuable pharmacological properties, for example, depressing and amphetamine potentiating effects. This can be demonstrated in animal tests, using advantageously mammals, such as mice and rats, as test objects. The compounds of the invention can be applied to the animals orally, preferably subcutaneously, or intraperitoneally, e.g. in the form of aqueous solutions or suspensions. The dosage may range between about 1 and 75 mg./kg./day, preferably between about 5 and 50 mg./kg./day, advantageously between about 10 and 25 mg./kg./day. The depressing effect is routinely tested in the mice jiggle test system, where the spontaneous movements of the animals are recorded. The amphetamine test is performed according to P. Carlton, Psychopharmacologia 1961, vol. II, p. 364, with about 8 month old male rats, which are trained to press a bar every 30 seconds, in order to avoid an electric shock applied through the floor grid. In case the animals receive 0.25 mg./kg./day of amphetamine, their performing rate for avoiding said shocks during a test period of about 2½ hours is higher than that of placebo (saline) treated animals, which latter again is higher than that of the animals treated with the compounds of the invention. In case the animals receive the compounds of the invention in the above-mentioned doses and about 45 minutes later the amphetamine, their rate of avoidance is highest. Besides their above-mentioned utility, the compounds of the invention are also useful as intermediates in the preparation of other valuable products, especially of pharmacologically active compounds.

Particularly useful are the compounds of Formula I, in which each of $R_1$ and $R_2$ is hydrogen or lower alkyl and $R_3$ is 3- or 4-pyridyl, mono- or di-(lower alkyl)-3- or 4-pyridyl (lower alkyl, halogeno)-3- or 4-pyridyl or mono- or di-(halogeno)-3- or 4-pyridyl and therapeutically useful acid addition salts thereof.

Preferred compounds of the invention are those of Formula I in which each of $R_1$ and $R_2$ is hydrogen or methyl and $R_3$ is 3- or 4-pyridyl, mono- or dimethyl-3- or 4-pyridyl, methyl, chloro-3- or 4-pyridyl or mono- or dichloro-3- or 4-pyridyl and therapeutically useful acid addition salts thereof.

Especially valuable are compounds of Formula II

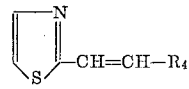

in which $R_4$ is 3-pyridyl, 4-pyridyl or 2-chloro-4-pyridyl and therapeutically useful acid addition salts thereof which, when given at i.p. doses between about 5 and 15 mg./kg./day to rats show depression during the whole 2½ hour test period or when given at i.p. doses between about 10 and 20 mg./kg./day to rats markedly potentiate the effects caused by 0.25 mg./kg./day d-amphetamine i.p.

The compounds of this invention are prepared according to methods known per se. For example, they are obtained by:

(a) Condensing compounds of the formulae

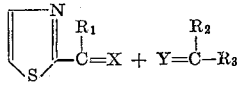

in which one of X and Y represents 2 hydrogen atoms and the other is oxo or reactively converted oxo or (b) Condensing compounds of the formulae

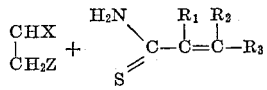

in which Z is free or reactively esterified hydroxy or (c) Reacting a compound of the formula

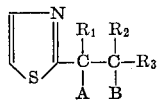

in which one of A and B is hydrogen and the other is Z, with an agent capable of eliminating ZH or (d) Hydrogenating a compound of the formula

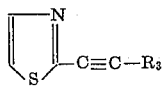

and, if desired, converting any resulting compound into another compound of the invention.

A starting material mentioned under items (a) and (b), containing a reactively converted oxo group is, for example, an acetal or ketal derived from alcohols or glycols, such as lower alkanols or alkanediols, e.g. methanol, ethanol, ethylene, glycol, 1,2- or 1,3-propylene glycol, or any other reactive derivative, e.g. bisulfite addition compounds and the like.

A reactively esterified hydroxy group present in the starting material mentioned under items (b) and (c) is, for example, such derived from a strong mineral acid, particularly a hydrohalic acid, e.g. hydrochloric or hydrobromic acid, a sulfuric or sulfonic acid, such as a lower alkane or benzene sulfonic acid, e.g. methane, ethane or p-toluene sulfonic acid. An agent capable of eliminating water or acids from the compounds mentioned under (c) is, for example, a dehydrating acid, its halide or anhydride, e.g. sulfuric or polyphosphoric acid, phosphorus oxychloride or pentoxide.

The hydrogenation of the compounds mentioned under item (d) is advantageously carried out with catalytically activated or nascent hydrogen, i.e. hydrogen in the presence of nickel, palladium or platinum catalysts, or hydrogen generated electrolytically or by the action of metals on acids or alcohols, e.g. zinc or iron and mineral or alkanoic acid; sodium or aluminum or their amalgams and lower alkanols.

The compounds of the invention so obtained can be converted into each other according to methods known per se. For example, the above-mentioned hydrogenation may be carefully controlled and/or carried out under mild conditions in order to obtain first the compounds of Formula I, and under more vigorous conditions the hydrogenated derivatives thereof. In case catalytically activated hydrogen is used, the course of the hydrogenation can easily be managed by the amount of hydrogen used in the hydrogenation. Any resulting free compound can be converted into a corresponding acid addition salt, for example by reacting it with an inorganic or organic acid, such as a therapeutically useful acid, or with a corresponding anion exchanger preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric or perchloric acid, or organic acids, e.g. carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, aminosalicylic, embonic, nicotinic, methanesulfonic, ethanesulfonic, hydroxy-ethanesulfonic, ethylenesulfonic, halogenbenzenesulfonic, toluenesulfonic, naphthalenesulfonic, sulfanilic and cyclohexylsulfamic acid; methionine, tryptophan, lysine and arginine.

These or other salts, for example, the picrates, can also be used for purification of the resulting free compounds, which are converted into salts, the salts separated and the free compounds liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example by separation of diastereomeric salts thereof, e.g. by the fractional crystallization of d- or l-tartrates.

The above reactions are carried out according to standard methods, in the presence or absence of diluents, preferably such as are inert to the reagents and are solvents thereof, of catalysts, condensing, neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to those compounds of the invention, which are indicated above as the preferred embodiments of the invention.

The starting material used is known or, if new, may be prepared according to methods used for the known starting materials or analogs respectively. For example, compounds mentioned under item (d) are advantageously prepared from corresponding metal acetylides and halopyridines or -thiazoles respectively.

The pharmaceutically active compounds of the invention can be used, for example, for the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols, and other known excipients. The compositions may be, for example, in solid form as tablets, dragées or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, and all parts wherever given are parts by weight.

EXAMPLE 1

The stirred mixture of 7.4 g. thiazole-2-carboxaldehyde, 5.9 g. 3-picoline and 75 ml. acetic anhydride is refluxed for 6 hours and stirring is continued overnight at room temperature. It is evaporated in vacuo, the residue taken up in the minimum amount of diethyl ether and the solution acidified with ethanolic hydrochloric acid. The precipitate formed is filtered off, to yield the 2-[2-(pyridyl-3)-ethenyl]-thiazole dihydrochloride of the formula

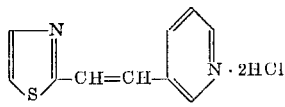

melting at 236–237°.

EXAMPLE 2

The stirred mixture of 14.8 g. thiazole-2-carboxaldehyde, 11.8 g. 4-picoline and 150 ml. acetic anhydride is refluxed for 6 hours and stirred overnight at room temperature. It is evaporated in vacuo, the residue taken up in 250 ml. diethyl ether, the solution filtered and the filtrate acidified with ethanolic hydrochloric acid. The precipitate formed is filtered off and recrystallized from aqueous ethanol, to yield the 2-[2-(pyridyl-4)-ethenyl]-thiazole dihydrochloride of the formula

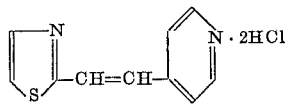

melting at 240–241°.

EXAMPLE 3

The stirred mixture of 8.9 g. thiazole-2-carboxaldehyde, 10 g. 2-chloro-4-picoline and 100 ml. acetic anhydride is refluxed for 6 hours and stirred overnight at room temperature. It is evaporated in vacuo, the residue taken up in the minimum amount of diethyl ether, the solution filtered and the filtrate acidified with ethanolic hydrochloric acid. The precipitate formed is filtered off and recrystallized from isopropanol, to yield the 2-[2-(2-chloro-pyridyl-4)-ethenyl]-thiazole hydrochloride of the formula

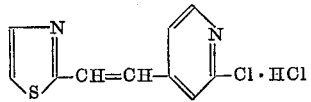

melting at 138–141°.

EXAMPLE 4

Preparation of 10,000 tablets each containing 100.0 mg. of the active ingredient:

Formula

| | G. |
|---|---|
| 2-[2-(pyridyl-4)-ethenyl]-thiazole dihydrochloride | 1,000.00 |
| Lactose | 2,535.00 |
| Corn starch | 125.00 |
| Polyethylene glycol 6,000 | 150.00 |
| Talcum powder | 150.00 |
| Magnesium stearate | 40.00 |
| Purified water, q.s. | |

Procedure

All the powders are passed through a screen with openings of 0.6 mm. Then the drug substance, lactose, talcum, magnesium stearate and half of the starch are mixed in a suitable mixer. The other half of the starch is suspended in 65 ml. water and the suspension added to the boiling solution of hte polyethylene glycol in 260 ml. water. The paste formed is added to the powders which are granulated, if necessary, with an additional amount of water. The granulate is dried overnight at 35°, broken on a screen with 1.2 mm. openings and compressed into tablets using concave punches with 10.3 mm. diameter, uppers bisected.

What is claimed is:

1. A 2-(2-pyridyl-lower alkenyl)-thiazole of the formula

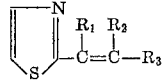

in which each of $R_1$ and $R_2$ is hydrogen or lower alkyl and $R_3$ is 3- or 4-pyridyl or 3- or 4-pyridyl substituted by at most 2 members selected from the group consisting of lower alkyl, lower alkoxy and halogen, dihydro derivatives containing an ethylene moiety instead of the ethenylene moiety or a 4,5-dihydro-thiazolyl radical instead of the thiazolyl radical, tetrahydro derivatives containing both of said hydrogenated moieties or therapeutically useful acid addition salts thereof.

2. A compound as claimed in claim 1, in which formula each of $R_1$ and $R_2$ is hydrogen or lower alkyl and $R_3$ is 3- or 4-pyridyl, mono- or di-(lower alkyl-3- or 4-pyridyl, (lower alkyl, halogen)-3- or 4-pyridyl or mono- or di-(halogeno)-3- or 4-pyridyl and therapeutically useful acid addition salts thereof.

3. A compound as claimed in claim 1, in which formula each of $R_1$ and $R_2$ is hydrogen or methyl and $R_3$ is 3- or 4-pyridyl, mono- or dimethyl-3- or 4-pyridyl, methyl, chloro-3- or 4-pyridyl or mono- or dichloro-3- or 4-pyridyl and therapeutically useful acid addition salts thereof.

4. A compound as claimed in claim 3 and having the formula

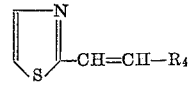

in which $R_4$ is 3-pyridyl, 4-pyridyl or 2-chloro-4-pyridyl and therapeutically useful acid addition salts thereof.

5. A compound as claimed in claim 3 and being the 2-[2-(pyridyl-4)-ethenyl]-thiazole or a therapeutically useful acid addition salt thereof.

References Cited

UNITED STATES PATENTS

| 2,512,180 | 6/1950 | Smith | 260—240 X |
| 2,954,292 | 9/1960 | Duffin et al. | 260—240 X |
| 2,965,485 | 12/1960 | Duffin et al. | 260—240 X |

OTHER REFERENCES

German printed publication (Auslegeschrift) No. 1,159,450, 3 pages, Dec. 19, 1963.

Elderfield, vol. 5, "Heterocyclic Compounds," pages 490 to 491 relied upon, John Wiley and Sons (1957).

Index Chemicus, vol. 24, abstract No. 74917 (abstract of Pappalardo et al.), Jan. 23, 1967.

JOHN D. RANDOLPH, Primary Examiner

U.S. Cl. X.R.

260—294.8 D, 999